Patented July 1, 1930

1,769,506

UNITED STATES PATENT OFFICE

HAROLD GRAY, OF AKRON, OHIO, ASSIGNOR TO THE B. F. GOODRICH COMPANY, OF NEW YORK, N. Y., A CORPORATION OF NEW YORK

EBONITE COMPOSITION AND METHOD OF PRODUCING THE SAME

No Drawing.  Application filed April 2, 1923.  Serial No. 629,508.

This invention relates to the art of preparing hard rubber or ebonite compositions and to the products resulting therefrom.

An unvulcanized ebonite mix, comprising rubber, a vulcanizing agent such as sulfur, an organic or inorganic accelerator, hard rubber dust or fillers such as whiting, clay or gas black, is usually so stiff that it does not mix easily on a rubber mill or calender. It has been common practice to add a small percentage of a so called "softener" or "flux" to cause sufficient flow of the mix and thereby facilitate factory processing prior to vulcanization. Castor oil, paraffin, rosin, pine oil, mineral rubber and wood pitches are characteristic examples of such fluxes.

Even where such fluxes have been used, however, the vulcanized product has been such that in "remolding" it (by which I mean molding the already-vulcanized ebonite), certain disadvantages have been encountered. When ebonite sheet is subjected to pressure in a mold of complicated design, for example, either the material is too stiff to fill the mold accurately or excessive temperature, pressure or time is required for the formation of a properly molded article. When remolded from the the form of ebonite dust the particles do not coalesce and the remolded article is either inaccurate in shape or so brittle that it breaks easily along planes of weak cleavage between the particles.

While it has been known that ebonite will soften under the action of temperatures around 450° F. to 570° F. and that hard rubber dust may be remolded by the application of high temperature and high pressure, such remolded dust does not show the homogeneity which is desirable and cracks or breaks with comparative ease unless subjected to extremely high pressures and temperatures for a considerable period of time. It has also been known that ebonite may be fused to a product which is semi-liquid while hot and congeals on cooling to a heat-plastic solid which may be remolded at temperatures considerably lower than the unfused ebonite, but such a high-temperature fusing process requires the manipulation of a stiff pasty mass, is apt to cause burning or carbonization, and does not easily produce a uniform product.

My chief object is to provide an improved, highly heat-plastic, hard rubber or ebonite which may be molded or remolded in a short time, whereby increased production may be had from a given mold equipment.

A further object is to provide a highly homogeneous and physically improved remolded ebonite composition prepared from hard rubber scrap.

A still further object is to provide a vulcanized ebonite composition which will flux with uncured rubber as a filler so as to produce a homogeneous mixture. Another object is to provide an ebonite composition highly soluble in solvents such as benzene or naphtha, so as to be used as a paint, lacquer, binder or stiffening material.

I find that these objects may be obtained by the use of substantially larger amounts of the so called fluxes than have heretofore been used. The resulting highly heat-plastic ebonites are found to be sufficiently hard at summer temperatures for use in the manufacture of telephone receiver caps or transmitter mouth-pieces, radio telephone jack-halves, plug-halves for electric irons, etc., where the size of the article does not give sufficient self-contained weight to induce cold flow, or in larger articles which are supported or reinforced or wherein a small change in shape is permissible.

As an example of the effect of a high percentage of flux in an ebonite on the softening point of the vulcanized product I have prepared a master mix consisting of parts by weight of rubber 100, organic accelerator 2, and sulfur 40. To different portions of this master stock were added various softeners and the complete mixes were then vulcanized for 3 hours in a press at 300° F. The softening temperatures, indicated below, are chosen as the point where the tangent of the temperature-deflection curve hits the temperature axis. These deflections were measured by a reading telescope outside an oven wherein standard strips were supported on two knife-edges and a standard load applied by means of a stirrup to the center of the horizontal bar of ebonite.

| Softener | Parts by weight added to 142 parts of the master mix | Softening point |
|---|---|---|
| | | Fahrenheit |
| None | | 153° |
| Glue | 50 | 133 |
| Candelilla wax | 30 | 129 |
| Para-cumarone | 30 | 124 |
| Pontianak resin | 50 | 120 |
| Rosin | 30 | 118 |
| Pine oil 50, extra sulfur 40 | 90 | 91 |
| Brown factice | 50 | 80 |

As a second example I find that if to a commercial mix for the manufacture of battery jar covers I add 50 percent mineral rubber or 50 percent pine oil and 40 additional percent of sulfur, the resulting vulcanized ebonite may be powdered with ease and its softening point is so low that it may be worked on a hot rubber mill to form a homogeneous sheet. The powder or the sheet may be quickly remolded at moderate temperature and pressure to form articles of complicated design.

The addition of 50 parts of pine oil and 40 additional parts of sulfur to a mix consisting of rubber 100, accelerator 2, sulfur 40, and clay 40, when vulcanized for 1 hour at 300° F., gives a non-blooming ebonite, a product which powders easily and which will remold in from 2 to 5 minutes at 350° F. to a homogeneous unit.

I find that I am not limited to addition of the softener or flux to the uncured ebonite, but may admix the same with comminuted scrap ebonite and by the application of heat may flux the same at a much lower temperature than that required to fuse the original scrap, to produce a homogeneous product having a low softening point so that it may be remolded with greater ease. For example hard rubber dust may be mixed with 20% by weight of Pontianak resin, factice or the sulfur reaction product of terpenes and subjected to temperatures around 300° F. to 350° F. to produce a homogeneous product which will remold at a much lower temperature than the original mix.

In order easily to remold comminuted ebonite it is not always necessary entirely to flux the dust with a softener. A superficial action of the flux is often sufficient to cause the proper coalescing of the particles on the application of heat and pressure and in such a case a correspondingly smaller amount of the softener may be used.

An advantage of my method is found in the working of the vulcanized product on a rubber mill. My soft ebonite or softened ebonite scrap will flux on a hot mill to a homogeneous sheet which will further flux with raw rubber as distinguished from the usual ebonite dust which mixes with rubber as a pigment without fluxing.

Another advantage of my invention is that a solution of ebonite dust in a softener may be thinned with a volatile solvent and used as a paint for the protection of metals, wood, fabric, etc., or may be applied hot in the absence of volatile solvents, to fabrics, wood, metal or the like as a "heat-plastic", for its binding, stiffening or protective action.

There are several advantages of this invention other than those enumerated in the above examples. My soft ebonites grind and powder more easily than the usual types of ebonite. By proper choice of flux I may regulate the degree of heat plasticity of ebonite as well as by control of the amount of flux used or by control of the conditions of treatment.

An equal weight of white factice added to ebonite dust starts to flux at about 410° F. A brown factice mix shows fluxing at about 310° F., while when mineral rubber is the softener the ebonite begins to soften at about 220° F. In each case the heating may be continued from the point where coalescence of the surface of the particles takes place on remolding, through the stage where the treated dust will flux on a rubber mill or into an uncured rubber mix, to the stage of perfect fusion where the product is soluble in volatile solvents.

A further advantage is found in the curing of ebonite in sheet form, where blanks are punched from the cured sheets and remolded in molds of accurate design. Not only does the use of high amounts of softeners greatly facilitate the remolding operation but all scrap, trimmings or waste may be reworked and are therefore nearly as valuable as the original blank sheets.

I do not limit myself to any specific rubber softener but may use such organic substances as have the desired property fluxing with ebonite at elevated temperatures. The term "rubber softeners" as employed in the appended claims is restricted to substantially non-volatile substances capable of softening rubber, and does not include raw gum or compositions containing substantial proportions of gum. Neither do I wish to limit myself entirely to a given condition of temperature or time for the softening of comminuted ebonite since such factors vary, as shown, with the specific softener in use.

I claim:

1. A process for the preparation of a readily remoldable ebonite compound which comprises mixing comminuted vulcanized hard-rubber with a substantial amount of a rubber softener, and heating the mix at atmospheric pressure to form a homogeneous product, the said rubber softener being substantially free from raw gum.

2. A process for the preparation of a readily remoldable ebonite compound which comprises fluxing comminuted vulcanized hard-rubber by heating it in the absence of molding pressures with a substantial amount of a rubber softener, the said rubber softener being substantially free from raw gum.

3. A process for the preparation of a readily remoldable ebonite compound which comprises heating comminuted vulcanized hard-rubber with a substantial amount of a rubber softener adapted to flux with the hard-rubber in the absence of molding pressures at a temperature lower than the fluxing temperature of the hard-rubber, the said rubber softener being substantially free from raw gum.

4. A process for the preparation of a readily remoldable ebonite compound which comprises mixing comminuted vulcanized hard-rubber with a substantial amount of a substance selected from the group containing oils, waxes, resins, mineral rubbers, factices, wood pitches and glue, and heating the mix at ordinary pressures to form a homogeneous product, the said substance being substantially free from raw gum.

5. A process for the preparation of an ebonite compound comprising heating 100 parts by weight of comminuted ebonite with 10 or more parts of an organic rubber softener for such time and at such temperature as to produce a homogeneous product, the said rubber softener being substantially free from raw gum.

6. A composition of matter comprising comminuted ebonite in solid solution with a rubber softener, the said rubber softener being substantially free from raw gum.

7. A composition of matter comprising comminuted ebonite in solid solution with a rubber softener, the softener being present in such quantity as to render the composition readily remoldable at relatively low temperatures, the said rubber softener being substantially free from raw gum.

8. A composition of matter comprising hard rubber dust and such amount of rubber softener, fluxed into a homogeneous mass therewith, as to produce a hard, heat-plastic material which remolds at relatively low temperatures, the said rubber softener being substantially free from raw gum.

9. As a composition of matter, an ebonite containing such amount of a rubber softener intimately incorporated therein as to render it readily remoldable at temperatures materially lower than the remolding temperatures of ebonite, the said rubber softener being substantially free from raw gum.

10. A composition of matter comprising 100 parts by weight of ebonite in solid solution with 10 or more parts of an organic rubber softener, the said rubber softener being substantially free from raw gum.

11. A composition of matter comprising a homogeneous material containing ebonite and a rubber softener, said admixture being soluble in volatile organic solvents.

12. A composition of matter comprising ebonite in solid solution with a substance selected from a class comprising oils, waxes, resins, mineral rubbers, factices, wood pitches and glue, the said substance being substantially free from raw gum.

In witness whereof I have hereunto set my hand this 31st day of March, 1923.

HAROLD GRAY.